(12) United States Patent
Shibukawa

(10) Patent No.: US 7,385,133 B2
(45) Date of Patent: *Jun. 10, 2008

(54) TECHNIQUE FOR SIMPLIFYING SETTING OF NETWORK CONNECTION ENVIRONMENT FOR ELECTRONIC MUSIC APPARATUS

(75) Inventor: Takeo Shibukawa, Toyoda-cho (JP)

(73) Assignee: Yamaha Corporation (JP)

( * ) Notice: Subject to any disclaimer, the term of this patent is extended or adjusted under 35 U.S.C. 154(b) by 503 days.

This patent is subject to a terminal disclaimer.

(21) Appl. No.: 11/084,599

(22) Filed: Mar. 18, 2005

(65) Prior Publication Data

US 2005/0204902 A1 Sep. 22, 2005

(30) Foreign Application Priority Data

Mar. 18, 2004 (JP) ............................. 2004-078498

(51) Int. Cl.
*G10H 7/00* (2006.01)
*G10H 1/00* (2006.01)

(52) U.S. Cl. ............................. 84/645; 84/600; 84/609; 700/94

(58) Field of Classification Search ................... 84/645, 84/609; 700/94
See application file for complete search history.

(56) References Cited

U.S. PATENT DOCUMENTS

| 5,464,946 | A  | * | 11/1995 | Lewis ........................... 84/609 |
| 6,153,820 | A  | * | 11/2000 | Fujimori ....................... 84/633 |
| 6,345,294 | B1 | * | 2/2002  | O'Toole et al. ............. 709/222 |
| 6,353,172 | B1 | * | 3/2002  | Fay et al. ...................... 84/609 |
| 6,369,310 | B1 | * | 4/2002  | Brunson et al. ............... 84/600 |
| 6,403,870 | B2 | * | 6/2002  | Aoki ............................ 84/609 |
| 6,583,348 | B2 | * | 6/2003  | Hasegawa et al. ............. 84/609 |
| 6,803,511 | B2 | * | 10/2004 | Mizuno ........................ 84/600 |
| 7,041,893 | B2 | * | 5/2006  | Hasegawa et al. ............. 84/609 |
| 7,189,911 | B2 | * | 3/2007  | Isozaki ......................... 84/609 |
| 2002/0007719 | A1 | * | 1/2002 | Hasegawa ..................... 84/609 |
| 2002/0029684 | A1 | * | 3/2002 | Hasegawa et al. ............. 84/609 |
| 2002/0161865 | A1 | * | 10/2002 | Nguyen ....................... 709/220 |
| 2003/0000368 | A1 | * | 1/2003 | Isozaki ......................... 84/609 |
| 2003/0115254 | A1 | * | 6/2003 | Suzuki ........................ 709/202 |

(Continued)

FOREIGN PATENT DOCUMENTS

JP 2000-148681 5/2000

(Continued)

OTHER PUBLICATIONS

Notice of Grounds for Rejection (Office Action), dated Dec. 25, 2007, issued in corresponding JP 2004-078498.

*Primary Examiner*—Lincoln Donovan
*Assistant Examiner*—Christina Russell
(74) *Attorney, Agent, or Firm*—Rossi, Kimms & McDowell LLP

(57) ABSTRACT

From an external terminal apparatus, an electronic music apparatus acquires, online or offline, environment setting information for setting an environment for connecting the electronic music apparatus to a communication network via given network connecting equipment. The electronic music apparatus stores the acquired environment setting information into a storage section as connection environment information defining an environment for connecting the electronic music apparatus to the communication network via the given network connecting equipment. Connection to the communication network via the network connecting equipment can be established in accordance with the stored connection environment information.

18 Claims, 6 Drawing Sheets

U.S. PATENT DOCUMENTS

| | | | |
|---|---|---|---|
| 2003/0126031 A1* | 7/2003 | Asami | 705/26 |
| 2003/0140009 A1* | 7/2003 | Namba et al. | 705/59 |
| 2003/0212466 A1* | 11/2003 | Alferness | 700/94 |
| 2005/0131558 A1* | 6/2005 | Braithwaite et al. | 700/94 |
| 2005/0197725 A1* | 9/2005 | Alexander et al. | 700/94 |
| 2006/0149398 A1* | 7/2006 | Sato et al. | 700/94 |
| 2006/0195789 A1* | 8/2006 | Rogers et al. | 715/727 |
| 2006/0217829 A1* | 9/2006 | Umezawa et al. | 700/94 |

FOREIGN PATENT DOCUMENTS

| | | | |
|---|---|---|---|
| JP | 2003-216148 A | | 7/2003 |
| JP | 2003216148 A | * | 7/2003 |
| JP | 2004-54477 A | | 2/2004 |
| JP | 2004054477 A | * | 2/2004 |

* cited by examiner

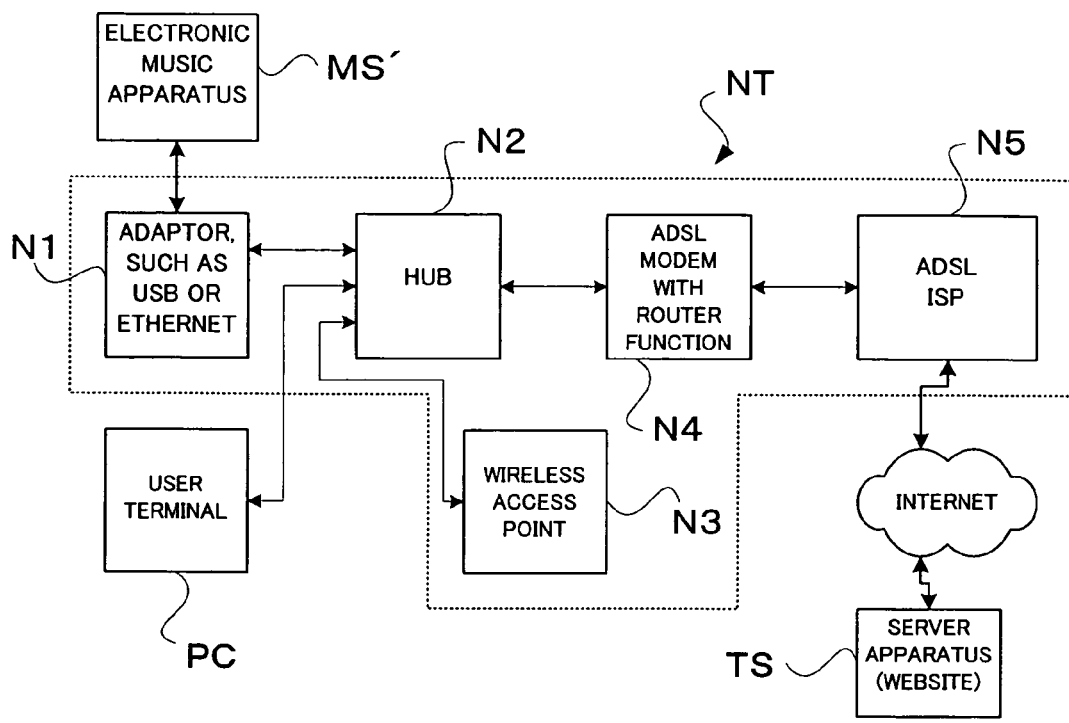

FIG. 3

ENVIRONMENT SETTING INFORMATION

| SETTING CATEGORY | SETTING ITEM | SETTING INFO. (CONTENT) |
|---|---|---|
| BROWSER SETTING | ENCODE | JAPANESE (AUTO. SELECTION) |
| | HOMEPAGE | OPTIONAL |
| | RETURN HOME TO INITIAL STATE | [RETURN] BUTTON |
| | IMAGE READ | ON |
| | TIME ZONE | JAPAN (GMT+9:00) |
| LAN SETTING | USE OF DHCP | NOT USES |
| | DNS SERVER | OPTIONAL |
| | IP ADDRESS | OPTIONAL |
| | SUBNET MASK | OPTIONAL |
| | GATEWAY | OPTIONAL |
| WIRELESS LAN SETTING | SSID | OPTIONAL |
| | CHANNEL | 10 |
| | ENCRYPTION | DONE |
| | FORMAT OF ENCRYPTION KEY | HEXADECIMAL |
| | LENGTH OF ENCRYPTION KEY | 64 BITS |
| | ENCRYPTION KEY | OPTIONAL |
| OTHER SETTING | PROXY SERVER | OPTIONAL |
| | PROXY PORT | OPTIONAL |
| | DELETION OF COOKIE | [DELETE] BUTTON |
| | INITIALIZATION OF ENVIRONMENT SETTING | [INITIALIZE] BUTTON |
| | DISPLAY OF CONNECTION STATE | [INFO. DISPLAY] BUTTON |

FIG. 4

TECHNIQUE FOR SIMPLIFYING SETTING OF NETWORK CONNECTION ENVIRONMENT FOR ELECTRONIC MUSIC APPARATUS

BACKGROUND OF THE INVENTION

The present invention relates to electronic music apparatus and server apparatus which have network connection functions to acquire various music-related information via a communication network, such as the Internet, and methods and computer programs related thereto. More particularly, the present invention relates to an improved electronic music apparatus and server apparatus which can significantly facilitate setting of an environment for connection to a communication network, and an improved network connection environment setting method and program. The terms "electronic music apparatus" used in connection with the present invention generically refer to electronic equipment having music-related reproduction/display functions, such as electronic musical instruments, automatic performance apparatus, audio reproduction apparatus, effecters, automatic musical composition apparatus, musical score creation/display apparatus, and computers having some type of music or sound reproduction software installed therein; namely, the terms "electronic music apparatus" are used herein to represent a concept embracing all types of music-related electronic music apparatus or equipment.

Today, a great varieties of services are provided from various websites managed by server apparatus, via the Internet and other communication networks. Great number of users can access their desired websites, using personal computers, PDAs and other electronic communication terminals, acquire various information, communicate with their friends and do shopping. Among the various services-providing websites on the communication networks are sites that provide various music-related information, such as information of music pieces and musical scores, and there have been known electronic music apparatus having a network (Internet) connection function capable of acquiring various music-related information from the services-providing website. One example of such electronic music apparatus is disclosed in U.S. Patent Application Publication No. U.S. 2003/0000368 corresponding to Japanese Patent Application Laid-open Publication No. 2002-372970. The electronic music apparatus, disclosed in the US2003/0000368 publication, is connectable to a communication network to acquire, as necessary, performance setting information from a server apparatus. Other relevant conventional techniques are disclosed in U.S. Pat. No. 6,803,511 and Japanese Patent Application Laid-open Publication No. 2000-148681.

The conventionally-known electronic music apparatus equipped with the network (Internet) connection function would present various inconveniences similar to those presented by the personal computers and PDAs. Namely, in order to receive services from a website on a communication network, it is necessary for each of the users of the electronic music apparatus to: establish accounts with an Internet service provider (ISP) and a communications carrier providing a telephone line or cable line; then purchase or rent network connecting equipment, such as a dialup modem or ADSL (Asymmetric Digital Subscriber Line) modem, router, hub, wireless access point, and/or the like; then set up necessary hardware by connecting the network connecting equipment as instructed; and then accurately set, in the electronic music apparatus, a variety of items of connection environment information corresponding to the network connecting equipment and setting information thereof. However, display devices provided in such electronic music apparatus equipped with the network connection function have a small-size screen capable of displaying only a small amount of information at a time, and thus these electronic music apparatus only have low processing capabilities to, for example, display visual explanations etc. for setting the connection environment information in the apparatus. Therefore, it has been difficult or almost impossible for the users of the electronic music apparatus to appropriately set the connection environment information while being assisted by displayed highly-detailed explanations. Further, because there are only a few users of a high knowledge level who have experienced setting the connection environment information in their electronic music apparatus, it has been hardly possible for the users to teach each other about how to set the connection environment information, and so on. Consequently, in setting the connection environment information in the conventionally-known electronic music apparatus, the users would suffer from a great burden and have to perform time-consuming operation. For these reasons, there has been a great demand or need for an improved electronic music apparatus which allows the user to set the connection environment information relatively easily.

SUMMARY OF THE INVENTION

In view of the foregoing, it is an object of the present invention to provide a technique which allows a user of an electronic music apparatus to readily set, with no great burden, an environment for connecting the electronic music apparatus to a communication network.

In order to accomplish the above-mentioned object, the present invention provides an electronic music apparatus capable of being connected to a communication network via given network connecting equipment, which comprises: an interface for connecting the electronic music apparatus to the given network connecting equipment; a storage section for storing connection environment information defining an environment for connecting the electronic music apparatus to the communication network via the given network connecting equipment; an acquisition section that acquires, from an external terminal apparatus connectable to the communication network, environment setting information for setting an environment for connecting the electronic music apparatus to the communication network via the given network connecting equipment; and a control section that causes the acquired environment setting information to be stored into the storage section as the connection environment information defining an environment for connecting the electronic music apparatus to the communication network via the given network connecting equipment. With such arrangements, a connection to the communication network can be established, via the interface and the network connecting equipment, in accordance with the connection environment information stored in the storage section.

According to the present invention, setting of the network connection environment, which would require a great amount of time and labor on the part of the user, is not performed by the electronic music apparatus, but, instead, performed by the external terminal apparatus, such as a personal computer, separate from the electronic music apparatus. Environment setting information thus provided outside the electronic music apparatus is acquired by the electronic music apparatus, and the acquired environment setting information is stored into the storage section of the electronic music apparatus as the connection environment information defining an environment for connecting the electronic music apparatus to the communication network via the given network connecting equipment. In this way, a connection to the communication network via the network connecting equipment can be established in accordance with the stored connection environment information. As a result, operation for setting the network connection environment, which has to be performed using the electronic music apparatus, can be extremely simplified and thus can be performed with an increased ease even in a case where the electronic music apparatus has insufficient display and input-operation functions for the setting of the network connection environment.

In an embodiment, the environment setting information is data of a file format generated on the basis of the external terminal apparatus accessing an environment-setting site provided by a given server apparatus that is resident on the communication network and connected with the external terminal apparatus. In an embodiment, the external terminal apparatus has stored therein connection environment information defining an environment for connecting the external terminal apparatus itself to the communication network via network connecting equipment of a same type as the given network connecting equipment, and the environment setting information supplied by the external terminal apparatus is based on an environment setting information file automatically generated by the given server apparatus on the basis of the connection environment information acquired from the external terminal apparatus. Because the environment setting information in the present invention is data of a file format, it is possible to automatically generate environment setting information for the electronic music apparatus on the basis of the connection environment information of the terminal apparatus that has been acquired by a predetermined server apparatus connected with the terminal apparatus over the communication network. Also, by just loading the thus-generated environment setting information, it is possible to readily set and store, in the electronic music apparatus, connection environment information corresponding to the network connecting equipment.

According to another aspect of the preset invention, there is provided a terminal apparatus capable of being connected to a communication network via given network connecting equipment, which comprises: a transmission section that transmits, to a server apparatus, connection environment information already set in the terminal apparatus and defining an environment for connecting the terminal apparatus to the communication network via the given network connecting equipment; a reception section that receives, from the server apparatus, environment setting information defining an environment for connecting an electronic music apparatus to the communication network via network connecting equipment of a same type as the given network connecting equipment, the environment setting information being information created by the server apparatus on the basis of the connection environment information, transmitted thereto by the transmission section, and then transmitted by the server apparatus; and a supply section that supplies the electronic music apparatus with environment setting information for the electronic music apparatus on the basis of the environment setting information received by the reception section, With such arrangements, connection environment information defining an environment, in which the electronic music apparatus is connected via the network connecting equipment to the communication network, is set in the electronic music apparatus so that the electronic music apparatus can be connected to the communication network.

According to still another aspect of the preset invention, there is provided a server apparatus connectable, via a communication network, with at least a terminal apparatus for communication therewith, which comprises: a reception section that receives, from the terminal apparatus, connection environment information already set in the terminal apparatus and defining an environment for connecting the terminal apparatus to the communication network via given network connecting equipment; a generation section that, on the basis of the connection environment information received by the reception section, generates environment setting information defining an environment for connecting an electronic music apparatus to the communication network via network connecting equipment of a same type as the given network connecting equipment; and a transmission section that transmits, to the terminal apparatus, the environment setting information generated by the generation section. With such arrangements, the terminal apparatus can supply the electronic music apparatus with environment setting information for the electronic music apparatus on the basis of the environment setting information transmitted thereto by the transmission section, and the electronic music apparatus can set, on the basis of the environment setting information supplied by the terminal apparatus, connection environment information defining an environment for connecting the electronic music apparatus to the communication network via the network connecting equipment, so that the electronic music apparatus can be connected to the communication network.

According to the invention, the connection environment information of the terminal apparatus, corresponding to the network connecting equipment, is transmitted to the server apparatus via the network connecting equipment of the same type as the given network connecting equipment for the electronic music apparatus, and then a file of environment setting information for the electronic music apparatus is automatically created in the server apparatus on the basis of the transmitted connection environment information of the terminal apparatus. Thus, the present invention achieves the benefits that the environment setting information file can be created with extreme ease and reliability and connection environment information can be set in the electronic music apparatus easily and accurately in accordance with the network connecting equipment employed.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 3 is a block diagram showing an example general hardware setup of network connecting equipment in the network connection environment setting system;

FIG. 4 is a conceptual diagram showing an example data structure of an environment setting information file handled in network connection environment setting system;

DETAILED DESCRIPTION OF THE INVENTION

Figure 1:
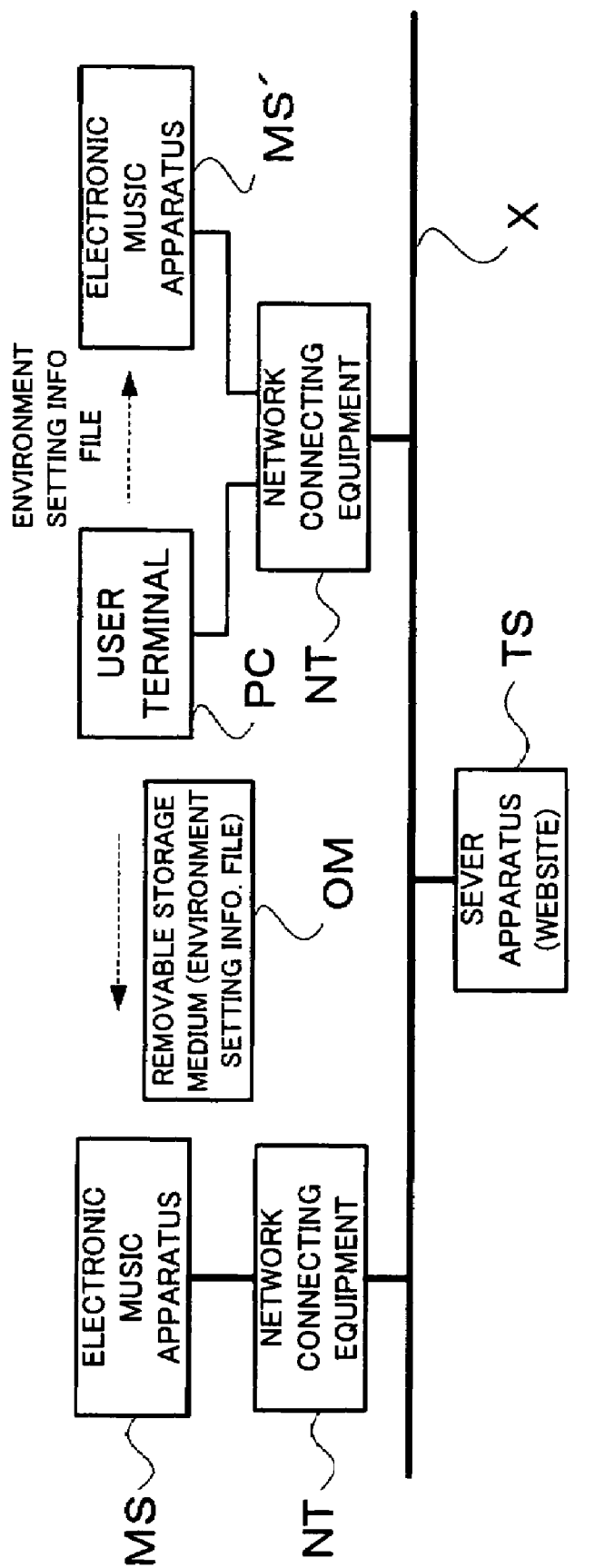
FIG. 1 is a block diagram showing an example general setup of a network connection environment setting system in accordance with an embodiment of the present invention.

FIG. 1 is a block diagram showing an example general setup of a network connection environment setting system in accordance with an embodiment of the present invention. The network connection environment setting system of FIG. 1 is arranged to allow any one of a plurality of (two in the illustrated example) electronic music apparatus MS, MS' and user terminals PC (network connecting terminal apparatus) to be connected to any one of one or more server apparatus (Web servers) TS resident on an external communication network X, such as the Internet, for communication with the server apparatus TS, in response to connection, to associated network connecting equipment NT, of the electronic music apparatus MS, MS' or user terminal PC. As will be later described, each of the electronic music apparatus MS, MS', server apparatus TS and user terminal PC is in the form of a standalone (i.e., independent) apparatus including a CPU, ROM, RAM, communication interface, etc. Certain one of the electronic music apparatus (MS) includes, for example in electronic music equipment like an electronic musical instrument (E.M.S.), various communication interfaces, such as a modem, terminal adaptor, LAN interface and USB interface, so that the electronic music apparatus MS has a function capable of accessing any one of the server apparatus TS via the associated network connecting equipment NT and communication network X. Other certain one of the electronic music apparatus (MS') can not only access the communication network X via the associated network connecting equipment NT, but also mutually communicate with the user terminal PC, such as a personal computer, connected with the electronic music apparatus MS' via the common network connecting device NT. In this way, various data etc. can be communicated between the user terminal PC and the electronic music apparatus MS'.

The user terminal PC can connect to any one of the server apparatus TS on the communication network X in response to setting therein of predetermined connection environment information in accordance with a structure of the network connecting equipment NT employed. In this way, various information can be communicated between the user terminal PC and the server apparatus TS. The network connecting equipment NT comprises various devices, such as a dialup modem or ADSL modem, router, hub, wireless access point, etc., necessary to connect the corresponding electronic music apparatus MS (MS') or user terminal PC to the communication network X, as will be later detailed in relation to FIG. 3. As noted previously, in order for the electronic music apparatus MS (MS') to receive services from any one of the server apparatus TS on the communication network X, it is necessary to set predetermined connection environment information in accordance with the structure etc. of the network connection equipment NT, as in the case of the user terminal PC already connected to the communication network X. Generally, the electronic music apparatus MS and MS' provide good operability with respect to their basic music-related functions, but have poor or insufficient display and input-operation functions for the network connection setting purposes; most of them have a small display screen and a very small number of operators (operating members), Therefore, in the instant embodiment, the electronic music apparatus MS and MS' are each arranged to receive a file of environment setting information for the associated network connection equipment NT (see FIG. 4) from another terminal apparatus having sufficient display and input-operation functions, such as the user terminal PC comprising a personal computer, so that the users of the music apparatus MS and MS' do not have to directly perform, on the music apparatus MS and MS', cumbersome and time-consuming input operation etc. for the network connection setting. For this purpose, in the environment setting system of FIG. 1, the electronic music apparatus MS, which is not connected to the communication network X via the common network connecting equipment NT sharable with the user terminal PC (network connection terminal apparatus, receives a removable storage medium OM, such as a smart medium, from the user terminal PC and performs the necessary setting of the connection environment information on the basis of an environment setting information file stored in the received removable storage medium OM. On the other hand, the electronic music apparatus MS', which is connected to the communication network X via the common network connecting equipment NT sharable with the user terminal PC, performs the necessary setting of the connection environment information on the basis of an environment setting information file transmitted directly from the user terminal PC. However, in this case too, the electronic music apparatus MS' may receive the environment setting information file from the user terminal PC via the removal storage medium OM so that the necessary setting of the connection environment information can be performed on the basis of the environment setting information file stored in the received removable storage medium OM. More specifically, the server apparatus TS automatically generates an environment setting information file (i.e. data of obtained by creating connection environment information of a file format corresponding to the electronic music apparatus MS (MS')) on the basis of network-environment-related information received from the user terminal PC, and then the server apparatus TS returns the thus-generated environment setting information file to the user terminal PC. Processes performed by the user terminals PC, server apparatus TS and electronic music apparatus MS (MS') will be detailed later.

Next, a description will be given about an example general hardware setup of one of the electronic music apparatus MS (MS'), server apparatus TS and user terminal PC which constitute the network connection environment setting system of FIG. 1. Because these electronic music apparatus MS (MS'), server apparatus TS and user terminal PC are constructed in generally the same manner, only the general hardware setup of the electronic music apparatus MS will be described representatively, with reference to FIG. 2. In the illustrated example of FIG. 2, the electronic music apparatus MS is in the form of an electronic musical instrument which itself has a network connection function capable of accessing a desired one of the server apparatus TS, via the associated network connecting equipment NT and communication network X, on the basis of setting, by the user, of the connection environment information.

Figure 2:
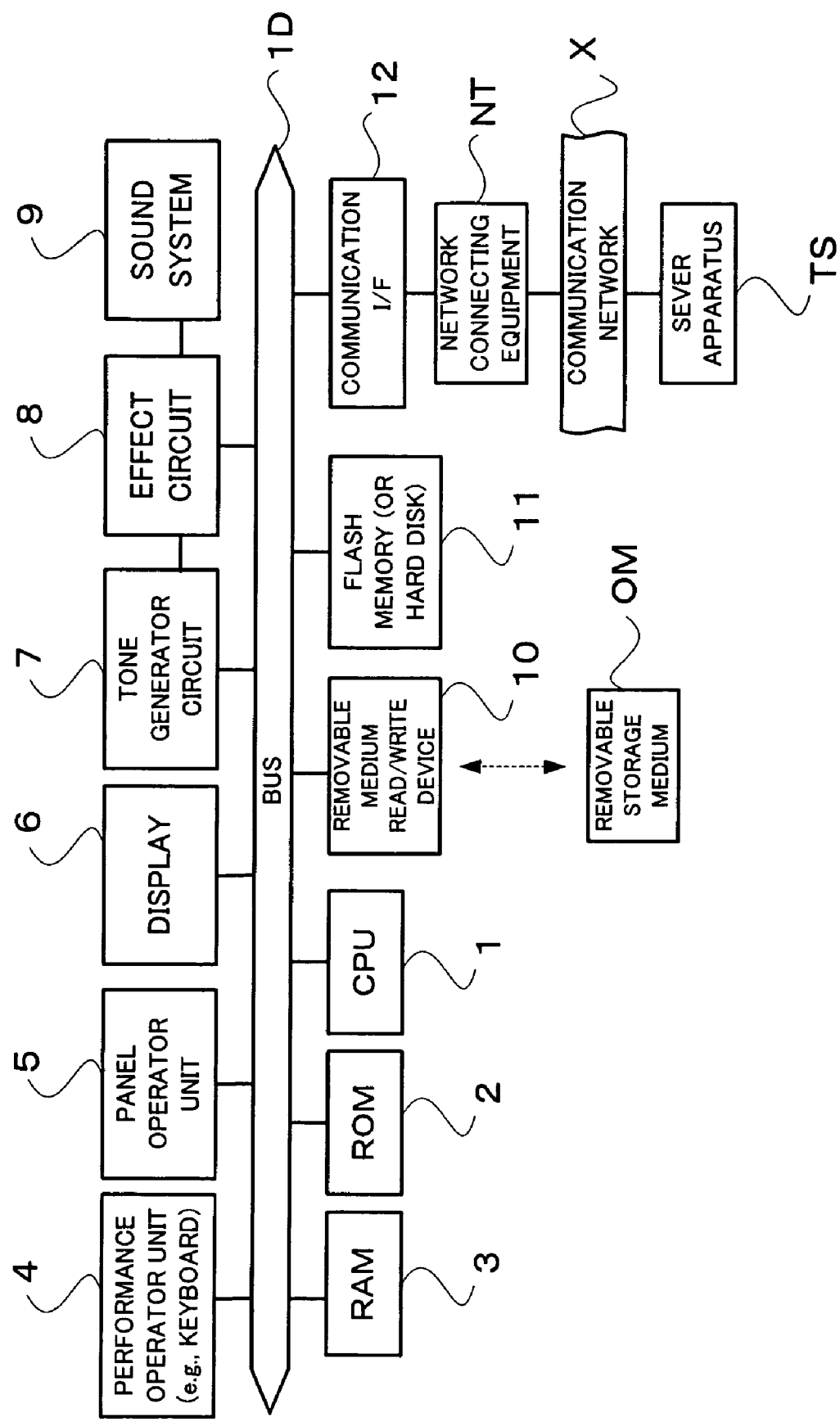
FIG. 2 is a block diagram showing an example general hardware setup of an electronic music apparatus in the network connection environment setting system of FIG. 1.

The electronic musical instrument (electronic music apparatus MS) illustrated in FIG. 2 is controlled by a microcomputer comprising a microprocessor unit (CPU) 1, a read-only memory (ROM) 2 and a random-access memory (RAM) 3. The CPU 1 controls all operations of the electronic musical instrument. To the CPU 1 are connected, via a data and address bus 1D, the ROM 2, RAM 3, performance operator unit 4, panel operator unit 5, display unit 6, tone generator circuit 7, effect circuit 8, removable medium read/write device 10, flash memory (or hard disk) 11 and communication interface (I/F) 12. The ROM 2 has prestored therein various programs to be executed by the CPU 1 and various data. The RAM 3 is used as a working memory for temporarily storing various data generated as the CPU 1 executes the programs. The RAM 3 is also used as a memory for storing the currently-executed program and data related thereto. Predetermined address regions of the RAM 3 are allocated to various functions and used as registers, flags, tables, memories, etc.

The performance operator unit 4 is, for example, in the form of a keyboard including a plurality of keys for selecting a pitch of each tone to be generated and a plurality of key switches provided in corresponding relation to the keys. The performance operator unit (e.g., keyboard) 4 can be used not only for a music performance but also as an input means for entering various setting information. The panel operator unit 5 comprises a text (character)-data-entering software keyboard for entering connection environment information etc. and various other software switches, and these software keyboard and software switches are so named because there are displayed on the display unit 6 through processing by software. Of course, the panel operator unit 5 may include various other operators for selecting, setting and controlling a tone pitch, tone color, effect, etc. The display unit 6 comprises a liquid crystal display (LCD) panel, CRT (Cathode Ray Tube) and/or the like, which displays various screens, such as a data input (entry) page (not shown) containing detailed explanations about an environment setting information file generated and transmitted by the server apparatus TS, as well as controlling states of the CPU 1. With reference to the data input page, the user can enter information related to a network environment that is necessary for generation of the environment setting information file, in the case where the electronic musical instrument is not directly connected to the communication network X via the common network connecting equipment NT sharable with the user terminal PC.

The tone generator (T.G.) circuit 7, which is capable of simultaneously generating a plurality of tone signals in a plurality of channels, receives, via the data and address bus 1D, various performance information generated in response to operation, by the user, of the performance operator unit 4 or generated on the basis of predetermined performance data and generates tone signals on the basis of the received performance information. The tone generator circuit 7 controls each tone signal to be generated on the basis of tone color parameters etc., and each of the tone signals thus generated by the tone generator circuit 7 is audibly reproduced or sounded by a sound system 9, including an amplifier and speaker, by way of the effect circuit 8. The effect circuit 8 imparts an effect to the tone signal supplied from the tone generator circuit 7. The tone generator circuit 7, effect circuit 8 and sound system 9 may be constructed in any conventionally-known manner. For example, the tone generator circuit 7 may employ any of the conventionally-known tone synthesis methods, such as the FM, PCM, physical model and formant synthesis methods. Further, the tone generator circuit 7 may be implemented by either dedicated hardware or software processing performed by the CPU 1 or DSP (not shown).

In the removable medium read/write device 10 built in the electronic musical instrument, there can be removably set a removable, readable/writable storage medium OM, such as a smart medium. The flash memory 11 (or hard disk) stores therein various data, such as connection environment information, various control programs to be executed by the CPU 11, and data related to various control to be performed in the electronic musical instrument. The communication interface (I/F) 12 is connected with the network connecting equipment NT so as to connect to the wired or wireless communication network X in accordance with an appropriate communication standard. The electronic musical instrument of FIG. 2 can perform, in addition to an ordinary musical instrument performance function and other music-related functions, various other functions that can be performed by an ordinary personal computer, such as a function of acquiring music-related information, data or program from the server apparatus TS (website) connected therewith via the network connecting equipment NT and communication network X. In a case where a given control program or various data is not stored in the ROM 2, hard disk or the like, the program or various data can be downloaded from the server apparatus TS to which the electronic musical instrument is connected. Further, music-related information, data or program can be acquired from the user terminal PC connected with the electronic musical instrument via the common network connecting equipment NT.

In the electronic musical instrument of FIG. 2, the performance operator unit 4 may be of any other structural or operating type than the keyboard type, such as a stringed instrument type, wind instrument type or percussion instrument type. Further, the electronic musical instrument of the present invention is not limited to the type where the performance operator unit 4A, display unit 6, etc. are incorporated together within the body of the apparatus; for example, the electronic musical instrument may be constructed in such a manner that the above-mentioned components are provided separately and interconnected via communication facilities such as various networks and/or the like. Moreover, the electronic music apparatus MS of the present invention may be constructed as an apparatus or equipment of any desired type than the electronic musical instrument, such as a personal computer, portable phone or other portable communication terminal, karaoke apparatus or game apparatus, as long as it is electronic equipment having the network connection function and music-related reproduction/display functions.

FIG. 3 is a block diagram showing an example general hardware setup of the network connecting equipment NT. As seen from FIG. 3, the network connecting equipment NT includes an adaptor N1, such as the USB or Ethernet (registered trademark), for connection, to the network connecting equipment NT, of a communication cable, a hub N2, a wireless access point N3, an ADSL modem N4 equipped with a router function, and an ADSL ISP N5. In the network connecting equipment NT, the hub N3 can be connected with the external terminal apparatus PC, so that the electronic music apparatus can be connected, via the terminal apparatus PC and the Internet (communication network), to any one of the server apparatus TS managing a user-desired website. The electronic music apparatus MS' too can be connected to any one of the server apparatus TS via the Internet (communication network), if the electronic music apparatus MS' has predetermined connection environment information duly set therein in accordance with the structure of the associated network connecting equipment NT; thus, various information can be communicated between the interconnected electronic music apparatus and server apparatus. Also, various information can be communicated between the electronic music apparatus MS' and user terminal PC connected to the common network connecting equipment NT. According to the present invention, even the electronic music apparatus MS, which had no connection environment information set therein through operation by the user and therefore could not connect to the Internet, is allowed to readily connect to the Internet by acquiring an environment setting information file from the terminal apparatus PC already connectable to the Internet and storing therein the thus-acquired environment setting information file.

Needless to say, the network connecting equipment NT in the instant embodiment is not limited to the above-described structure and may be constructed in any other suitable manner.

Next, with reference to FIG. 4, a description will be given about a data structure of an environment setting information file that is generated by the server apparatus TS on the basis of various information received from the user terminal PC and then used for creation of connection environment information in each of the electronic music apparatus MS (MS'). FIG. 4 is a conceptual diagram showing an example data structure of the environment setting information file. Specifically, the environment setting information file is data generated by the server apparatus TS in a predetermined file format. In other words, the environment setting information file is a file of connection environment information that needs to be set in the electronic music apparatus MS (MS') in order to connect the electronic music apparatus MS (MS') to the communication network X, i.e. a single file-format data set storing together therein predetermined setting items and setting content or information (data and values), per predetermined connection environment setting category, which used to be stored, as the connection environment information, separately from one another. The setting categories, such as "browser setting", "LAN setting", "wireless LAN setting" and "other setting" are variable in accordance with the network connecting equipment NT, such as a dialup modem or ADSL modem, router, hub, wireless access point, etc., and setting information thereof. Each of the setting categories is divided into more specific setting items, and setting content or information is stored for each of the setting items. Here, each of the setting information is either information set as connection environment information of the user terminal PC transmitted from the user terminal PC, or information entered by the user. Because details of these setting items and setting information are known in the art, detailed explanations thereof are omitted here. Note that the setting categories and setting items of each of the categories, having described above, are illustrative only and may be modified as necessary.

Further, each of the electronic music apparatus MS (MS') of the present invention performs setting therein of connection environment information on the basis of the environment setting information file (see FIG. 4) acquired from the user terminal PC via the removable storage medium OM or via the common network connecting equipment NT, so that the electronic music apparatus MS (MS') can be connected to the external communication network X, such as the Internet, and can thereby receive various services from the server apparatus TS on the communication network X. First, a description will be made about processing for generating an environment setting information file, with reference to FIG. 5 that is a flow chart showing an example operational sequence of the "environment setting information file generation processing". The "environment setting information file generation processing" is performed by the user terminal PC provided separately from the electronic music apparatus MS (MS') and connectable to the communication network X, and by the server apparatus TS (website) connected with the user terminal PC via the network connecting equipment NT and communication network X. Here, to facilitate understanding, various operations performed by the user terminal PC and server apparatus TS are shown together on a single sheet of drawing and will be explained sequentially in accordance with predetermined processing order. Note that dot-line arrows in FIG. 5 indicate transmission and reception of various data carried out, at predetermined timing, between the user terminal PC and the server apparatus TS.

First, in each of the user terminal PC and server apparatus TS, an apparatus startup process and other processes (including an initialization process) are performed (step S1 or S21). Then, the user terminal PC makes an access request to the server apparatus TS, managing a predetermined website (e.g., site provided by a maker of an electronic musical instrument or the like), to establish a connection with the server apparatus TS, receives a network-connection environment setting page for the electronic musical instrument (E.M.S.) from the server apparatus TS, and then displays the received setting page on the display unit 6 (step S2). Upon receipt of the access request from the user terminal PC, the server apparatus TS transmits, to the user terminal PC, an Internet-connection environment setting page for the electronic musical instrument (E.M.S.) (step S22). Then, the user terminal PC prompts the user to enter respective answers to various questions, related to a connection environment of the electronic musical instrument (E.M.S), made in the Internet-connection environment setting page (step S3). Namely, the environment setting page (not shown) is a display screen intended to allow the user to enter various information related to the connection environment of the electronic musical instrument. The various questions to be answered by the user include "type of the electronic musical instrument", "presence/absence of a LAN connection with the user terminal", "type of an OS (Operating System program) employed in the user terminal", "presence/absence of a wireless LAN connection", etc. The user is allowed to readily enter necessary information related to the connection environment of the electronic musical instrument of the user, by merely sequentially answering the questions made in the Internet-connection environment setting page. The thus-entered information related to the connection environment of the electronic musical instrument is transmitted to the server apparatus TS (step S3) and received by the server apparatus TS (step S22a).

If the user's answer to the question in the page regarding the "presence/absence of a LAN connection with the user terminal" is "YES" (step S4), i.e. if it has been determined at step SP4 that the electronic musical instrument of the user is connected via the common network connecting equipment NT with the user terminal PC already connected to the communication network X, the user terminal PC extracts the connection environment information already set therein and then sequentially transmits the extracted connection environment information to the server apparatus TS (step S5). The server apparatus TS is constantly checking whether or not the connection environment information has been received from the user terminal PC (step S23). If the connection environment information has been received from the user terminal PC (YES determination at step S23), the server apparatus TS creates, on the basis of the received connection environment information, an environment setting information file to allow the electronic musical instrument of the user to be connected to the communication network X and then transmits the created environment setting information file to the user terminal (step S24). The environment setting information file may be transmitted to the user terminal PC in any suitable manner, e.g. by downloading the file in accordance with the HTML protocol or by sending an e-mail with the file attached thereto. Once the user terminal PC receives the environment setting information file from the server apparatus TS, it displays the individual setting items and setting information of every setting category on the basis the received environment setting information file (step S6).

If, however, the server apparatus TS has not received any connection environment information from the user terminal PC (NO determination at step S23), it transmits, to the user terminal PC, a page (not shown), including in-depth and easy-to-understand explanatory displays for the individual setting items of each of the setting categories, to assist the user in entering information for the individual setting items (step S25). With a NO determination at step S4, i.e., if it has been determined at step SP4 that the electronic musical instrument of the user is not connected via the common network connecting equipment NT with the user terminal PC already connected to the communication network X, the user terminal PC displays the above-mentioned page received from the server apparatus TS on the display unit 6 and prompts the user to enter information for the individual setting items with reference to the in-depth and easy-to-understand explanatory displays of the page (step S7). Upon completion of the entry, by the user, of the information for the individual setting items, the user terminal PC transmits the entered information to the server apparatus TS (step S8). Then, the server apparatus TS creates an environment setting information file on the basis of the user-entered information free of errors, such as entry errors, and then transmits the thus-created environment setting information file to the user terminal PC (step S26). Namely, if the electronic musical instrument in question and user terminal PC are not connected to the common network connecting equipment NT as in the case of the electronic music apparatus MS in FIG. 1, the connection environment information of the user terminal PC can not be referred to or utilized by the user; thus, in such a situation, the user can enter information for the setting items, one by one, through the operations at steps S7 and S8.

Note that the environment setting information file may be created, at step S24 or S26, using the information related to the connection environment of the electronic musical instrument received at step S22a, in addition to the connection environment information and user-entered information.

Upon receipt of the environment setting information file from the server apparatus TS, the user terminal PC displays the individual setting items and setting information for each of the setting categories on the basis of the received environment setting information file (step S6). The user can correct or change the individual setting items and setting information (content) until all necessary changes have been made, i.e. until the user gets satisfied with all of the setting items and setting information (steps S9 and S10). When all of the necessary changes have been made (YES determination at step S10), the user terminal PC carries out a process for writing the environment setting information file into the electronic musical instrument (step S11). Namely, if it has been determined that the electronic musical instrument of the user and the user terminal PC are connected with each other via the common network connecting equipment NT, the environment setting information file is transmitted directly from the user terminal PC to the electronic musical instrument and stored into the flash memory 11 of the electronic musical instrument. If, on the other hand, it has been determined that the electronic musical instrument of the user and the user terminal PC are not connected with each other via the common network connecting equipment NT, the environment setting information file is temporarily stored in the user terminal PC and then transferred to the electronic musical instrument via the removable storage medium OM. At step S12, a determination is made as to whether or not the "environment setting information file generation processing" should be terminated (brought to an end). If the "environment setting information file generation processing" should not be terminated (NO determination at step S12), the processing reverts to step S2 to repeat the operations at and after step S2.

Figure 6:
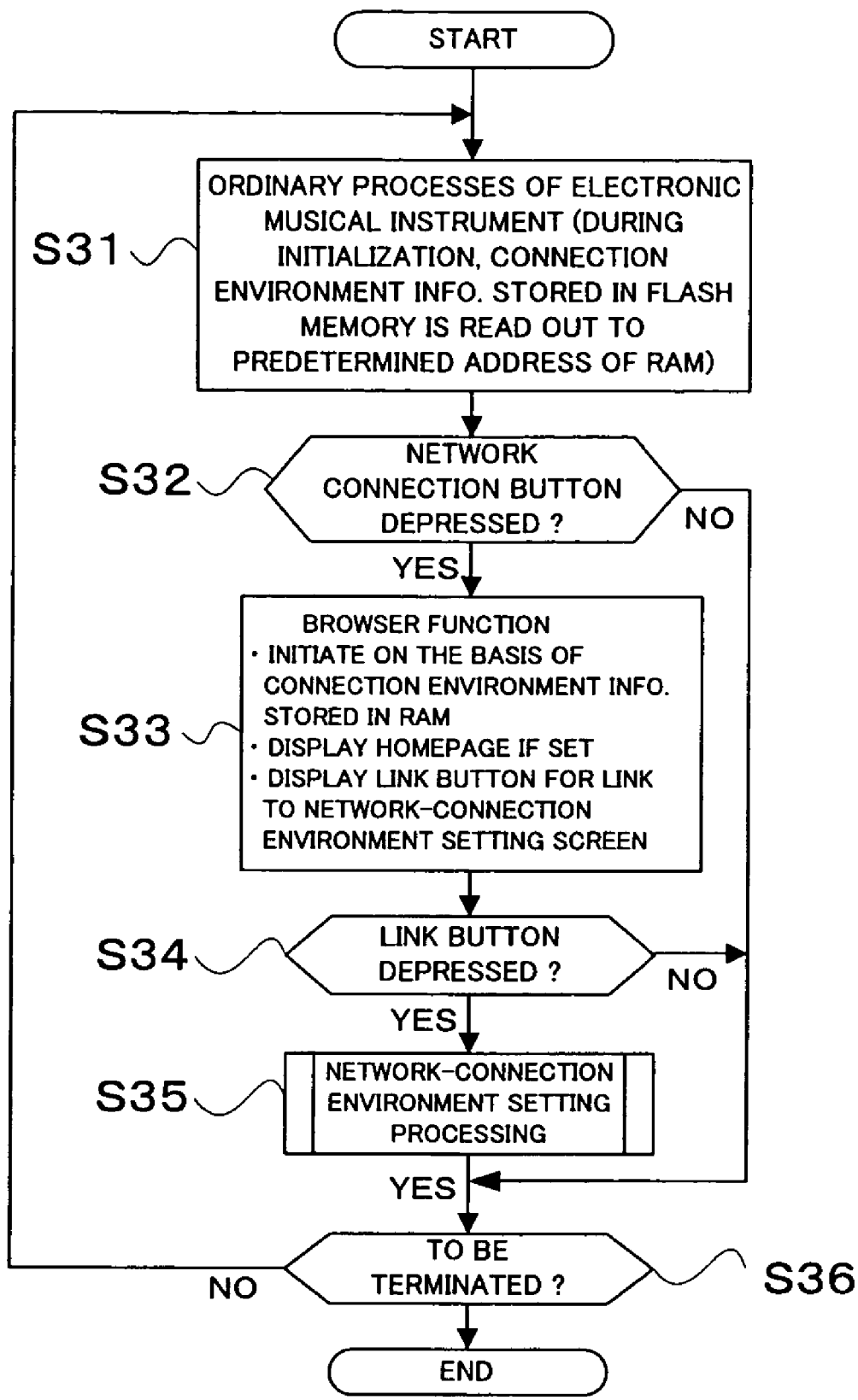
FIG. 6 is a flow chart showing an example operational sequence of network connection processing.

FIG. 6 is a flow chart showing an example operational sequence of "network connection processing" performed in the electronic musical instrument. At step S31, ordinary processes of the electronic musical instrument are carried out. The ordinary processes include an initialization process of the electronic musical instrument, in which the connection environment information stored in a predetermined area of the flash memory 11 of the musical instrument is read out and stored into a predetermined address area of the RAM 3. At step S32, a determination is made as to whether or not a predetermined "network connecting button" has been depressed. If the "network connecting button" has not been depressed (NO determination at step S32), the network connection processing jumps to step S36. If, on the other hand, the "network connecting button" has been depressed (YES determination at step S32), the network connection processing goes to step S33 to perform a browser function. The browser function is initiated on the basis of the connection environment information stored in the RAM 3; if the electronic musical instrument has already established a connection to the communication network X (namely, if the connection environment information has already been set accurately), the browser is started up after the electronic musical instrument has been connected to the communication network X. If, at that time, there is already set some homepage of the server apparatus TS, the user terminal PC receives the homepage from the server apparatus TS and displays the received homepage on the display unit 6. If, on the other hand, the electronic musical instrument has not yet established a connection to the communication network X (namely, if the connection environment information has not yet been set accurately), the browser is started up without the electronic musical instrument being connected to the communication network X, and a link button with an indication, e.g. "to a network-connection environment setting screen" is displayed on the display unit 6. At that time, a cautionary message to the user, e.g. "Not connected to the communication network. Please set an environment." may be displayed concurrently.

At step S34, a determination is made as to whether the link button displayed on the display unit 6 has been depressed. If the link button has not been depressed (NO determination at step S34), the processing jumps to step S36. If, on the other hand, the link has been depressed (YES determination at step S34), the processing goes to step S35 to carry out "network-connection environment setting processing" as will be later described in relation to FIG. 7. At step S36, a determination is made as to whether the "network connection processing" should be terminated. If the "network connection processing" should not be terminated (NO determination at step S36), the processing reverts to step S31 to repeat the operations at and after step S31.

Figure 7:
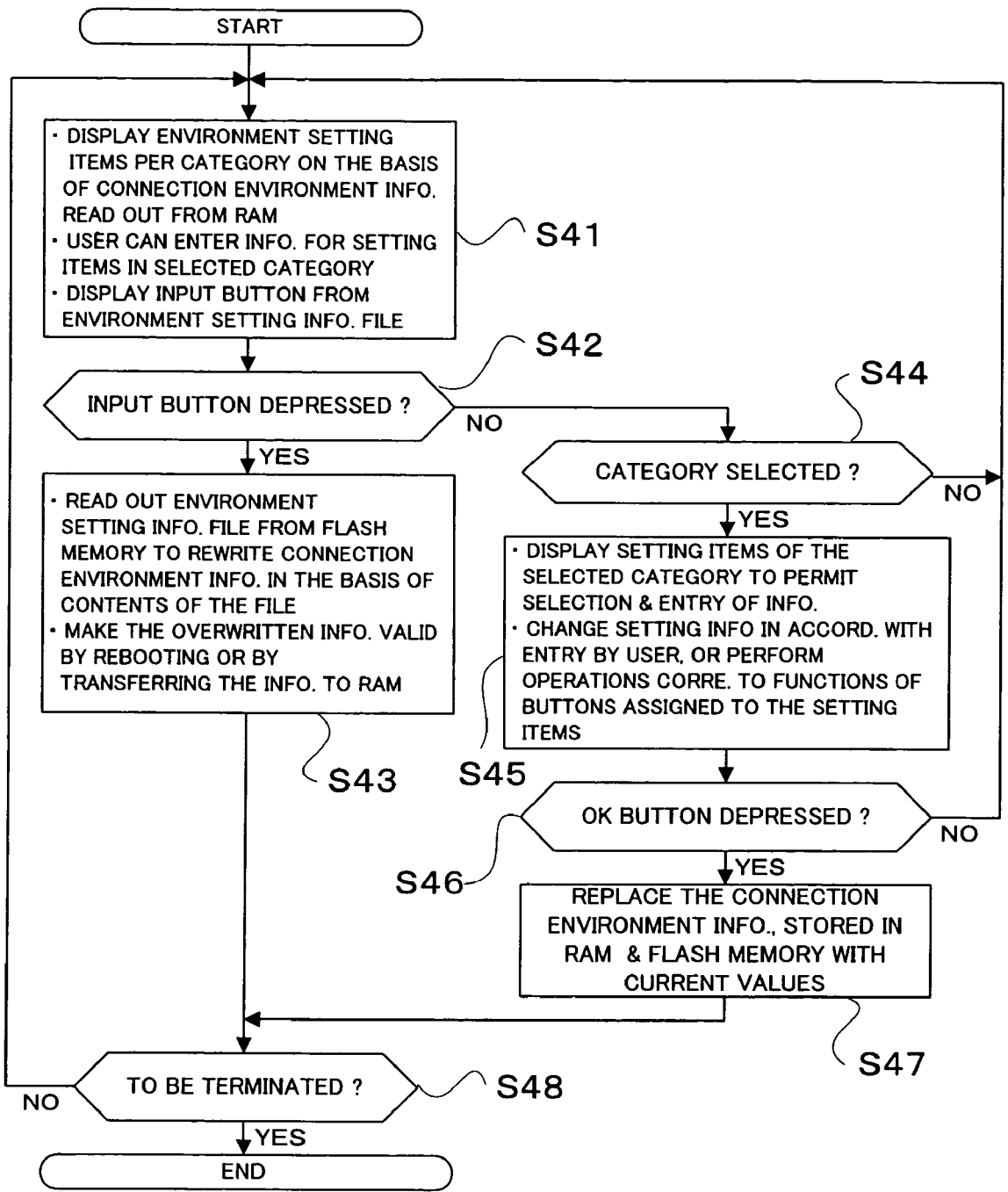
FIG. 7 is a flow chart showing an example operational sequence of network connection environment setting processing.

Next, a description will be given about the "network-connection environment setting processing" (step S35 of FIG. 6)

carried out in response to depression of the link button displayed on the display 6 during the above-described "network connection processing", with reference to FIG. 7. FIG. 7 is a flow chart showing an example operational sequence of the "network-connection environment setting processing". First, at step S41, the environment setting items are displayed on the basis of the connection environment information read out to the RAM 3 during the initialization process. At that time, the environment setting items are displayed per setting category, and the user can enter information for the environment setting items in a selected one of the categories. Further, an input button with an indication "input from an environment setting information file" is displayed on the display unit 6. At step S42, it is determined whether the above-mentioned input button has been depressed. If the input button has been depressed as determined at step S42, the environment setting information file stored in the predetermined address region of the flash memory 11 (i.e., the file created by the server apparatus TS and acquired by the electronic musical instrument via the user terminal PC) is read out and written over the connection environment information, currently stored in another address region of the flash memory 11, to rewrite the currently-stored connection environment information on the basis of the contents of the read-out environment setting information file (step S43). In order to make valid the newly-written (overwritten) connection environment information, it is normally necessary to reboot the electronic musical instrument; however, by transferring the connection environment information to a predetermined address region of the RAM 3 following the overwriting, the replacing or new connection environment information can be made valid without rebooting of the electronic musical instrument. Note that the input button may be of other than the displayed type as noted above as long as it is operable by the user to instruct setting of a connection environment.

If, on the other hand, the input button has not been depressed as determined at step S42, or if no environment setting information file has been acquired and thus "input from the environment setting information file" is impossible, a further determination is made as to whether or not any one of the setting categories displayed on the screen has been selected (step S44). If none of the setting categories has been selected as determined at step S44, the processing reverts to step S41. If, on the other hand, any one of the setting categories has been selected (YES determination at step S44), various operations are carried out at step S45. Namely, at step S45, the setting items of the selected category are displayed to permit selection and entry, by the user, of information for the displayed items of the selected category, so that the current setting information (i.e., current values of the setting items) can be changed in accordance with the entry by the user. Also, at step S45, operations corresponding to the functions of buttons assigned to the setting items are performed. At following step S46, a determination is made as to whether or not an "OK" button has been depressed. If the "OK" button has been depressed as determined at step S46, the connection environment information stored in the RAM 3 and flash memory 11 is rewritten or replaced (updated) with the current entered values (step S47). Then, at step S48, it is determined at step S48 whether the environment setting processing should be terminated. If the environment setting processing should not be terminated (NO determination at step S48), the environment setting processing reverts to step S41 to repeat the above-described operations at and after step S41.

As having been set forth above, in the case where the user terminal PC and the electronic musical instrument (electronic music apparatus MS) are interconnected via the common network connecting equipment NT, an environment setting information file for the electronic music apparatus is created with reference to predetermined information, already set in the user terminal PC and related to the communication network connection of the user terminal PC, and the connection environment information stored in the electronic musical instrument is rewritten on the basis of the created environment setting information file. Thus, by just entering simple information about the presence/absence of a LAN connection, type of the OS used and the like, the user of the electronic musical instrument can automatically set the connection environment information of the musical instrument to the same contents as set in the user terminal PC already set in a state connectable to the communication network X, because the values and other data of the individual setting items are stored in different locations specific to the type of the OS employed in the user terminal PC. In this way, the instant embodiment allows the electronic musical instrument to be readily connected to the communication network X. On the other hand, in the case where the user terminal PC and the electronic musical instrument are not interconnected via the common network connecting equipment NT, the user of the electronic musical instrument is prompted to enter the maker's name and model name of the network connecting equipment NT connected with the electronic musical instrument NT, name of the ISP, etc. Then, for some of the setting items that can be answered on the basis of the user-entered information, necessary information entry is automatically performed, while, for the other setting items that can not be answered on the basis of the user-entered information, information to be referred to is displayed supplementarily on the entry screen. In this way, the user can make various settings while viewing detailed explanations and entry assistance information on the screen, with the result that the setting operations for connecting the electronic musical instrument to the communication network X can be performed with extreme ease as compared with those performed in accordance with the conventional techniques.

Namely, according to the instant embodiment of the present invention, the connection environment information, which needs to be appropriately set in order to make the corresponding electronic musical instrument (electronic music apparatus MS) connectable to the external communication network X like the Internet, can be handled as a file (environment setting information file). Therefore, the externally-acquired environment setting information file can be readily loaded to set and store the connection environment information, which thus allows the setting of the connection environment information to be performed with an increased ease and can thereby lessen the burden on the user of the electronic musical instrument (electronic music apparatus MS). With the instant embodiment, access can be made to a predetermined website (server apparatus TS) through the user terminal PC, such as a separately-provided personal computer, connectable to the communication network X, and the user is prompted to enter information of a network connection environment on the website, in response to which an environment setting information file, automatically created by the server apparatus TS on the basis of the user-entered information can be transmitted from the website. Such arrangements permit meticulous input support by the website and can thereby significantly lessen the burden on the user. Further, because the user terminal PC includes the display unit having a greater display area than the display unit provided in the electronic musical instrument and has a greater information processing capability than the electronic musical instrument, it allows the user to enter necessary information in accordance with the meticulous explanations transmitted from the website during information entry for the setting, in the electronic music apparatus, of the connection environment information, which can achieve user-friendly connection environment setting means. Further, the instant embodiment allows the user to enter the necessary information with reference to the easier-to-understand explanations, although there is still a need to enter information regarding the same setting items as in the case where the information is entered directly via an electronic musical instrument or the like equipped with the network connection function. In this way, even a person with a little experience can easily see what values and data should be entered, so that erroneous entry by the person can be minimized. Further, the instant embodiment allows the user to select whether the setting of the connection environment information should be performed by the direct information entry or by the readout of the environment setting information file; thus, an experienced person can select the former approach, while an inexperienced person, like a beginner, can select the latter approach. As a result, the setting of the connection environment information can be performed in a manner well suited to individual users.

Figure 5:
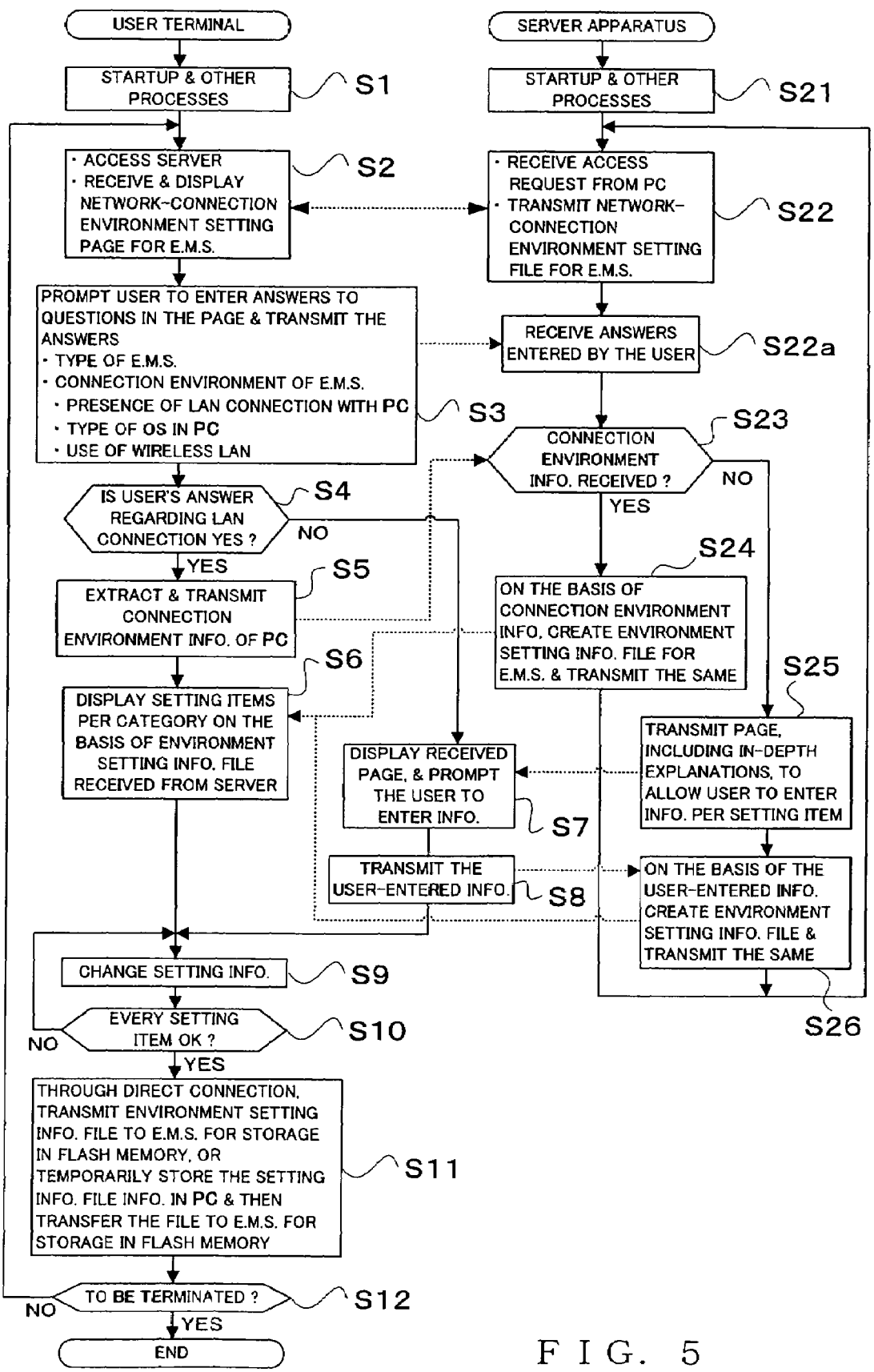
FIG. 5 is a flow chart showing an example operational sequence of environment setting information file generation processing.

Further, according to the above-described embodiment, the server apparatus TS receives the connection environment information from the "external terminal apparatus PC", creates an environment setting information file for the electronic musical instrument on the basis of the received connection environment information and then supplies the created environment setting information file to the "external terminal apparatus PC" (see steps S24 and S26 of FIG. 5). In an alternative, such operations or roles may be performed by the "external terminal apparatus PC" rather than by the server apparatus TS. Namely, the roles of the server apparatus TS may be programmed so that the "external terminal apparatus PC" can perform the operations for creating the environment setting information file on its own and then supply the thus-created environment setting information file to the electronic music apparatus MS.

What is claimed is:

1. An electronic music apparatus capable of being connected to a communication network via given network connecting equipment, said electronic music apparatus comprising:
   an interface for connecting said electronic music apparatus to the given network connecting equipment;
   a storage section for storing connection environment information defining an environment for connecting said electronic music apparatus to the communication network via the given network connecting equipment;
   an acquisition section that acquires, from an external terminal apparatus connectable to the communication network, environment setting information for setting an environment for connecting said electronic music apparatus to the communication network via the given network connecting equipment; and
   a control section that causes the environment setting information, acquired by said acquisition section, to be stored into said storage section as said connection environment information defining an environment for connecting said electronic music apparatus to the communication network via the given network connecting equipment,
   wherein a connection to the communication network is established, via said interface and the network connecting equipment, in accordance with the connection environment information stored in said storage section.

2. An electronic music apparatus as claimed in claim 1 wherein said control section causes the acquired environment setting information to be stored into said storage section as said connection environment information, in response to entry, by a user, of a predetermined instruction.

3. An electronic music apparatus as claimed in claim 1 wherein the environment setting information is data of a file format generated in response to the external terminal apparatus accessing an environment-setting site provided by a given server apparatus that is resident on the communication network and connected with the external terminal apparatus.

4. An electronic music apparatus as claimed in claim 3 wherein said external terminal apparatus has stored therein connection environment information defining an environment for connecting said external terminal apparatus itself to the communication network via network connecting equipment of a same type as the given network connecting equipment, and
   wherein the environment setting information supplied by said external terminal apparatus is based on an environment setting information file automatically generated by the given server apparatus on the basis of the connection environment information acquired from said external terminal apparatus.

5. An electronic music apparatus as claimed in claim 1 which further comprises an editing section that reads out the connection environment information from said storage section, displays the read-out connection environment information and edits the displayed connection environment information in response to entry operation by a user, and
   wherein a selection can be made as to whether the connection environment information should be set, as desired, on the basis of entry operation by the user via said editing section and then stored into said storage section, or the acquired environment setting information should be stored into said storage section as said connection environment information under control of said control section.

6. An electronic music apparatus as claimed in claim 1 wherein said environment setting information includes setting information related to at least one of browser setting, LAN setting and wireless LAN setting.

7. An electronic music apparatus as claimed in claim 1 which is connected with the external terminal apparatus for communication with the external terminal apparatus, and said acquisition section receives the environment setting information transmitted from the external terminal apparatus.

8. An electronic music apparatus as claimed in claim 1 wherein said acquisition section acquires the environment setting information via a removable storage medium containing the environment setting information created by the external terminal apparatus.

9. An electronic music apparatus as claimed in claim 1 which is connected with the external terminal apparatus via the given network connecting equipment.

10. A method for setting a connection environment for an electronic music apparatus capable of being connected to a communication network via given network connecting equipment, said electronic music apparatus comprising: an interface for connecting said electronic music apparatus to the given network connecting equipment; and a storage section for storing connection environment information defining an environment for connecting said electronic music apparatus to the communication network via the given network connecting equipment,
   said method comprising:
   a step of acquiring, from an external terminal apparatus connectable to the communication network, environment setting information for setting an environment for connecting said electronic music apparatus to the communication network via the given network connecting equipment; and a step of causing the environment setting information, acquired by said step of acquiring, to be stored into said storage section as said connection environment information defining an environment for connecting said electronic music apparatus to the communication network via the given network connecting equipment, wherein a connection to the communication network is established, via said interface and the network connecting equipment, in accordance with the connection environment information stored in said storage section.

11. A program, stored on a computer readable medium, containing a group of instructions for causing a computer to perform a procedure for setting a connection environment for an electronic music apparatus capable of being connected to a communication network via given network connecting equipment, said electronic music apparatus comprising: an interface for connecting said electronic music apparatus to the given network connecting equipment; and a storage section for storing connection environment information defining an environment for connecting said electronic music apparatus to the communication network via the given network connecting equipment, said procedure comprising:
acquiring, from an external terminal apparatus connectable to the communication network, environment setting information for setting an environment for connecting said electronic music apparatus to the communication network via the given network connecting equipment; and causing the environment information, acquired by said step of acquiring, to be stored into said storage section as said connection environment information defining an environment for connecting said electronic music apparatus to the communication network via the given network connecting equipment, wherein a connection to the communication network is established, via said interface and the network connecting equipment, in accordance with the connection environment information stored in said storage section.

12. A terminal apparatus capable of being connected to a communication network via given network connecting equipment, said terminal apparatus comprising:
a transmission section that transmits, to a server apparatus, connection environment information already set in said terminal apparatus and defining an environment for connecting said terminal apparatus to the communication network via the given network connecting equipment;
a reception section that receives, from the server apparatus, environment setting information defining an environment for connecting an electronic music apparatus to the communication network via network connecting equipment of a same type as the given network connecting equipment, the environment setting information being information created by the server apparatus on the basis of the connection environment information, transmitted thereto by said transmission section, and then transmitted by the server apparatus; and
a supply section that supplies the electronic music apparatus with environment setting information for the electronic music apparatus, on the basis of the environment setting information received by said reception section, whereby connection environment information defining an environment, in which the electronic music apparatus is connected via the network connecting equipment to the communication network, is set in the electronic music apparatus so that the electronic music apparatus can be connected to the communication network.

13. A terminal apparatus as claimed in claim 12 which is connected with the electronic music apparatus for communication with the electronic music apparatus, and wherein said supply section transmits the environment setting information to the electronic music apparatus.

14. A terminal apparatus as claimed in claim 12 wherein said supply section causes the environment setting information to be stored into a removable storage medium and supplies the electronic music apparatus with the environment setting information via the removable storage medium.

15. A method for assisting setting of a connection environment for an electronic music apparatus in a terminal apparatus capable of being connected to a communication network via given network connecting equipment, said method comprising:
a step of transmitting, to a server apparatus, connection environment information already set in said terminal apparatus and defining an environment for connecting said terminal apparatus to the communication network via the given network connecting equipment;
a step of receiving, from the server apparatus, environment setting information defining an environment for connecting the electronic music apparatus to the communication network via network connecting equipment of a same type as the given network connecting equipment, the environment setting information being information created by the server apparatus on the basis of the connection environment information, transmitted thereto by said step of transmitting, and then transmitted by the server apparatus; and
a step of supplying the electronic music apparatus with environment setting information for the electronic music apparatus, on the basis of the environment setting information received by said step of receiving,
whereby connection environment information defining an environment, in which the electronic music apparatus is connected via the network connecting equipment to the communication network, is set in the electronic music apparatus so that the electronic music apparatus can be connected to the communication network.

16. A program, stored on a computer readable medium, containing a group of instructions for causing a computer to perform a procedure for assisting setting of a connection environment for an electronic music apparatus in a terminal apparatus capable of being connected to a communication network via given network connecting equipment, said procedure comprising:
transmitting, to a server apparatus, connection environment information already set in said terminal apparatus and defining an environment for connecting said terminal apparatus to the communication network via the given network connecting equipment;
a step of receiving, from the server apparatus, environment setting information defining an environment for connecting the electronic music apparatus to the communication network via network connecting equipment of a same type as the given network connecting equipment, the environment setting information being information created by the server apparatus on the basis of the connection environment information, transmitted thereto by said step of transmitting, and then transmitted by the server apparatus; and supplying the electronic music apparatus with environment setting information for the electronic music apparatus, on the basis of the environment setting information received by said step of receiving, whereby connection environment information defining an environment, in which the electronic music apparatus is connected via the network connecting equipment to the communication network, is set in the electronic music apparatus so that the electronic music apparatus can be connected to the communication network.

17. A server apparatus connectable, via a communication network, with at least a terminal apparatus for communication therewith, said server apparatus comprising:

a reception section that receives, from the terminal apparatus, connection environment information already set in the terminal apparatus and defining an environment for connecting the terminal apparatus to the communication network via given network connecting equipment;

a generation section that, on the basis of the connection environment information received by said reception section, generates environment setting information defining an environment for connecting an electronic music apparatus to the communication network via network connecting equipment of a same type as the given network connecting equipment; and a transmission section that transmits, to the terminal apparatus, the environment setting information generated by said generation section, whereby the terminal apparatus can supply the electronic music apparatus with environment setting information for the electronic music apparatus on the basis of the environment setting information transmitted thereto by said transmission section, and the electronic music apparatus can set, on the basis of the environment setting information supplied by the terminal apparatus, connection environment information defining an environment for connecting the electronic music apparatus to the communication network via the network connecting equipment, so that the electronic music apparatus can be connected to the communication network.

18. A method for assisting setting of a connection environment for an electronic music apparatus in a server apparatus connectable, via a communication network, with at least a terminal apparatus for communication therewith, said method comprising:

a step of receiving, from the terminal apparatus, connection environment information already set in the terminal apparatus and defining an environment for connecting the terminal apparatus to the communication network via given network connecting equipment;

a generation step of, on the basis of the connection environment information received by said step of receiving, generating environment setting information defining an environment for connecting an electronic music apparatus to the communication network via network connecting equipment of a same type as the given network connecting equipment; and a step of transmitting, to the terminal apparatus, the environment setting information generated by said generation step, whereby the terminal apparatus can supply the electronic music apparatus with environment setting information for the electronic music apparatus on the basis of the environment setting information transmitted thereto by said step of transmitting, and the electronic music apparatus can set, on the basis of the environment setting information supplied by the terminal apparatus, connection environment information defining an environment for connecting the electronic music apparatus to the communication network via the network connecting equipment, so that the electronic music apparatus can be connected to the communication network.

* * * * *